United States Patent [19]

Kock

[11] Patent Number: 4,778,927
[45] Date of Patent: Oct. 18, 1988

[54] WHOLLY AROMATIC MESOMORPHIC POLYESTERS AND THE PREPARATION THEREOF

[75] Inventor: Hans-Jakob Kock, Ludwigshafen, Fed. Rep. of Germany

[73] Assignee: BASF Aktiengesellschaft, Ludwigshafen, Fed. Rep. of Germany

[21] Appl. No.: 938,064

[22] Filed: Dec. 4, 1986

[30] Foreign Application Priority Data

Dec. 4, 1985 [DE] Fed. Rep. of Germany ....... 3542814

[51] Int. Cl.⁴ .................. C08G 63/02; C08G 63/18
[52] U.S. Cl. .................... 528/176; 528/125; 528/128; 528/173; 528/190; 528/193; 528/194
[58] Field of Search ............ 528/176, 173, 190, 193, 528/125, 128, 194

[56] References Cited

U.S. PATENT DOCUMENTS

| | | | |
|---|---|---|---|
| 4,118,372 | 10/1978 | Schaefgen | 528/190 |
| 4,219,461 | 8/1980 | Calundann | 260/40 P |
| 4,224,433 | 9/1980 | Calundann et al. | 528/128 |
| 4,375,530 | 3/1983 | Hay et al. | 524/605 |
| 4,436,894 | 3/1984 | Urasaki et al. | 528/176 |
| 4,536,561 | 8/1985 | Schmidt et al. | 528/176 |
| 4,564,669 | 1/1986 | Dicke et al. | 528/173 |
| 4,600,764 | 7/1986 | Dicke et al. | 528/193 |
| 4,664,972 | 5/1987 | Connolly | 528/173 |

FOREIGN PATENT DOCUMENTS

| | | |
|---|---|---|
| 0139303 | 5/1985 | European Pat. Off. . |
| 0072540 | 4/1986 | European Pat. Off. . |
| 1507207 | 4/1978 | United Kingdom . |

OTHER PUBLICATIONS

K. H. Illers–Makromol. Chem. 127 (1969) s. 1 ff.

Primary Examiner—John Kight
Assistant Examiner—M. L. Moore
Attorney, Agent, or Firm—Keil & Weinkauf

[57] ABSTRACT

Wholly aromatic polyesters which form a liquid-crystalline fiber-forming melt below 300° C. and composed of (a) from 5 to 35 mol % of repeat units of the formula I

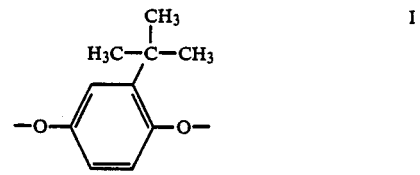

(b) from 3 to 15 mol % of repeat units of the formula II

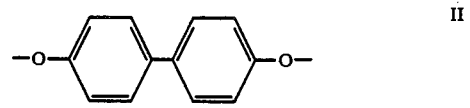

(c) a molar amount corresponding to the total amount of (a) and (b) of repeat units of the formula III

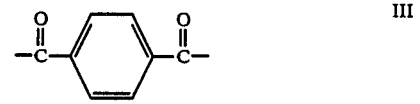

and (d) not less than 10 mol % of repeat units of the formula IV

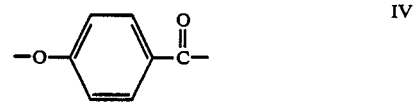

the molar proportions of components a, b, c and d adding up to 100 mol % in each case, the preparation thereof and fibers, films, moldings and surface coating materials prepared therefrom.

10 Claims, No Drawings

WHOLLY AROMATIC MESOMORPHIC POLYESTERS AND THE PREPARATION THEREOF

Wholly aromatic liquid-crystalline polyesters are known. U.S. Pat. No. 4,224,433 discloses liquid-crystalline polyesters which are composed of units derived from 2,6-dihydroxyanthraquinone, 3-hydroxybenzoic acid, terephthalic acid and/or isophthalic acid. The polyesters described therein have relatively high melting points and are processable only at above 300° C. In addition, they have glass transition temperatures Tg of <130° C., which impairs the heat distortion resistance.

U.S. Pat. No. 4,219,461 describes liquid-crystalline polyesters composed of units derived from 4-hydroxybenzoic acid, 2,6-hydroxynaphthalenecarboxylic acid, hydroquinone and terephthalic acid. However, these polyesters are not sufficiently heat-distortion-resistant. The same is true of the liquid-crystalline polyesters disclosed in German Laid-Open Application DOS No. 3,325,705 which are composed of units derived from 4-hydroxybenzoic acid, terephthalic acid and/or isophthalic acid as well as 2,7-dihydroxynaphthalene with or without hydroquinone.

EP Application No. 72,540 likewise discloses aromatic polyesters based on terephthalic acid, p-hydroxybenzoic acid and hydroquinones substituted by tertiary alkyl radicals of 5 or more carbon atoms. However, these polyesters are only processable at above 300° C. Nothing is said about the heat distortion resistance thereof.

It is an object of the present invention to provide wholly aromatic liquid-crystalline polyesters which permit low processing temperatures while having good sustained use properties at elevated temperatures and which, moreover, have little self-color, a smooth surface and high chemical resistance.

We have found that this object is achieved with wholly aromatic polyesters which form a liquid-crystalline fiber-forming melt below 300° C. and are composed of (a) from 5 to 35 mol % of repeat units of the formula I

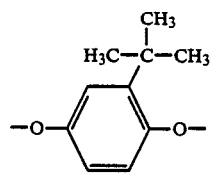

(b) from 3 to 15 mol % of repeat units of the formula II

II

—O—⟨benzene⟩—⟨benzene⟩—O—

(c) a molar amount corresponding to the total amount of (a) and (b) of repeat units of the formula III

III

—C(=O)—⟨benzene⟩—C(=O)— and (d) not less than 10 mol % of repeat units of the formula IV

IV

—O—⟨benzene⟩—C(=O)— the molar proportion of components a, b, c and d adding up to 100 mol % in each case.

The novel wholly aromatic liquid-crystalline polyesters have the advantage of not needing high processing temperatures and, furthermore, of having good sustained use properties even at elevated temperatures. The novel wholly aromatic polyesters further have a high stiffness and resilience, a smooth surface, little self-color and high chemical resistance.

The liquid-crystalline state of the polyesters can be detected with a polarization microscope by a method described in German Published Application DAS No. 2,520,819. Applied in a thickness of 10 μm between glass plates and viewed between crossed polarizers, the polyester melts have textures which can be ascribed to a mesomorphic (nematic) phase.

The polyesters according to the invention are composed of (a) from 5 to 35 mol % of repeat units of the formula I

I $CH_3$
$H_3C—C—CH_3$
—O—⟨benzene⟩—O— the starting compound used being t-butylhydroquinone, (b) from 3 to 15 mol % of repeat units of the formula II

II

—O—⟨benzene⟩—⟨benzene⟩—O— the starting compound used being 4,4'-dihydroxybiphenyl, (c) a molar amount corresponding to the total amount of (a) and (b) of repeat units of the formula III

III

—C(=O)—⟨benzene⟩—C(=O)— the starting compound used being terephthalic acid, (d) from 10 to 70 mol % of repeat units of the formula IV

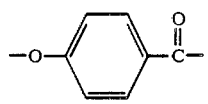

the starting compound used being p-hydroxybenzoic acid.

In preferred wholly aromatic polyesters according to the invention, some of units (b) are replaced by (e) repeat units of the formula V

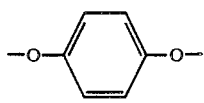

a suitable starting compound being hydroquinone, and/or (f) repeat units of the formula VI

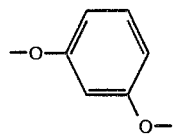

a suitable starting compound being resorcinol, and/or (g) repeat units of the formula VII

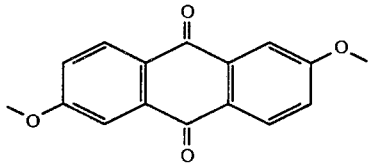

a suitable starting compound being 2,6-dihydroxyanthraquinone, and/or (h) repeat units of the formula VIII

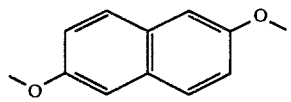

a suitable starting compound being 2,6-dihydroxynaphthalene.

In the preferred polyesters, units (e) (f) and/or (g) are advantageously present in an amount of from 5 to 15 mol %. It has further proved advantageous for the molar proportion of units (a) to be from 15 to 25 mol %. In particularly advantageous polyesters, the molar proportion of the total amount of (a) and of one or more units (e), (f) and (g) is from 25 to 35 mol %.

It will be readily understood that the total amount of hydroxy compounds is matched in each case by an equivalent amount of terephthalic acid and/or isophthalic acid.

Preferred wholly aromatic liquid-crystalline polyesters have a glass transition temperature of ≧160° C. The glass transition temperature is measured by the DSC method described by K. H. Illers et al. in Makromol. Chem. 127 (1969), 1. The wholly aromatic liquid-crystalline polyesters according to the invention form a liquid-crystalline fiber-forming melt at <300° C., in particular <280° C. Preference is also given to liquid-crystalline polyesters which have a partial crystallinity at >220° and <280° C.

The copolyesters according to the invention can be obtained by various techniques, as described, for example, in U.S. Pat. Nos. 4,375,530 and 4,118,372.

In a particularly advantageous embodiment, the polyesters according to the invention are obtained by converting the aforementioned starting materials in the underivatized form using anhydrides of lower fatty acids, in particular acetic anhydride, at elevated temperatures, with or without catalysts, specifically by heating the dry starting compounds together with excess fatty acid anhydride, which is advantageously present in a molar excess of not less than 5%, based on the hydroxyl groups present, in an inert gas atmosphere to the reflux temperature. The reaction mixture is refluxed at 150°-200° C. for example for not more than 5 hours, preferably up to 2 hours and is then raised to 300°-350° C., for example in the course of 2-2½ hours. Acetic anhydride and acetic acid are distilled off. To complete the reaction it is expedient to employ reduced pressure, for example down to 5-20 mbar, toward the end of the condensation.

It is a remarkable and unforeseeable feature of using a single reaction stage that the desired polymers are obtained in a relatively short time in a troublefree and complete reaction even without catalysts. This is all the more remarkable as the large number of chemically different hydroxyl groups would be expected to lead to differences in reactivity and hence to inadequate polymer synthesis.

The wholly aromatic liquid-crystalline polyesters thus obtained can be further condensed in the solid state, for example at 150°-250° C., until the desired viscosity is obtained. This postcondensation in solid phase can take place not only before but also after thermoplastic processing.

The wholly aromatic liquid-crystalline polyesters according to the invention are suitable for preparing filaments, films, foams and industrial moldings by injection molding or extruding.

The invention is illustrated by the following examples.

EXAMPLE 1

0.2 mol of terephthalic acid, 0.26 mol of 4-hydroxybenzoic acid, 0.16 mol of t-butylhydroquinone, 0.04 mol of 4,4'-dihydroxybiphenyl and 0.86 mol of acetic anhydride are weighed into a flask equipped with stirrer, nitrogen inlet and distillation attachment, and under nitrogen are heated in a melt bath to 100° C. The temperature is then raised to 150° C. in 30', to 200° C. in a further 100' and finally to 325° C. in 120'.

The pressure is then reduced to 560 mbar and subsequently halved every 10'. The final vacuum is mbar. In this way a highly viscous fiber-forming melt is obtained. The polymer melt and solidified polymer have a pearlescent luster. DSC measurements indicate a glass transition temperature of 164° C. The intrinsic viscosity is 1.6 dl/g, measured at 60° C. in an 0.1% strength by weight solution in pentafluorophenol. The polymer forms a fiber-forming liquid-crystalline melt at 280° C.

COMPARATIVE EXAMPLE 1

0.2 mol of terephthalic acid, 0.26 mol of 4-hydroxybenzoic acid, 0.04 mol of 4,4'-dihydroxybiphenyl, 0.16 mol of methylhydroquinone and 0.86 mol of acetic anhydride are condensed as described in Example 1. The final temperature is 315° C., and the final vacuum is 20 mbar.

DSC measurements indicate a glass transition temperature of 93° C. and a melting point of >300° C. The product is brittle, does not form a fiber and, on processing, exhibits clear signals of decomposition.

EXAMPLE 2

0.18 mol of terephthalic acid, 0.02 mol of isophthalic acid, 0.26 mol of p-4-hydroxybenzoic acid, 0.16 mol of t-butylhydroquinone, 0.04 mol of 4,4'-dihydroxybiphenyl and 0.86 mol of acetic anhydride are condensed as described in Example 1. The final temperature is 315° C. The polymer obtained is highly viscous and fiber-forming. DSC measurements indicate a glass transition temperature of 165° C. The intrinsic viscosity is 0.9 dl/g. The polymer forms a liquid-crystalline fiber-forming melt at 290° C.

EXAMPLE 3

0.2 mol of terephthalic acid, 0.26 mol of 4-hydroxybenzoic acid, 0.09 mol of t-butylhydroquinone, 0.07 mol of hydroquinone, 0.04 mol of 4,4'-dihydroxybiphenyl and 0.86 mol of acetic anhydride are condensed as described in Example 1. The final temperature is 325° C. The final vacuum is 30 mbar. The polymer obtained is highly viscous and fiber-forming. DSC measurements indicate a glass transition temperature of 160° C. and an endothermic melting point of 260° C. The intrinsic viscosity is 1.1 dl/g. The polymer can be processed from the melt at 290° C.

EXAMPLE 4

0.2 mol of terephthalic acid, 0.26 mol of 4-hydroxybenzoic acid, 0.16 mol of t-butylhydroquinone, 0.02 mol of 4,4-dihydroxybiphenyl, 0.02 mol of 2,6-dihydroxyanthraquinone and 0.86 mol of acetic anhydride are condensed as described in Example 1. The final temperature is 330° C. The polymer obtained is highly viscous and fiber-forming. DSC measurements indicate a glass transition temperature of 160° C. The intrinsic viscosity is 1.5 dl/g. The polymer can be processed from the melt at 260° C.

I claim:

1. A wholly aromatic polyester which forms a liquid-crystalline fiber-forming melt below 300° C. and is composed of (a) from 5 to 35 mol % of repeat units of the formula I

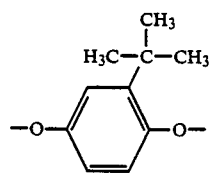

(b) from 3 to 15 mol % of repeat units of the formula II

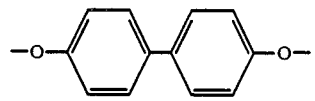

(c) a molar amount corresponding to the total amount of (a) and (b) of repeat units of the formula III

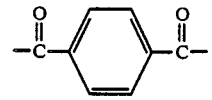

and (d) not less than 10 mol % of repeat units of the formula IV

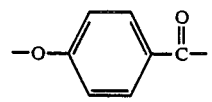

the molar proportions of components a, b, c and d adding up to 100 mol % in each case.

2. A wholly aromatic polyester as claimed in claim 1, wherein some of the units of the formula II are replaced by one or more of the units (e) 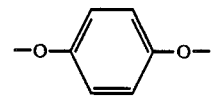 V (f) 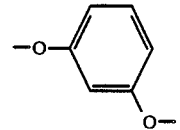 VI (g) 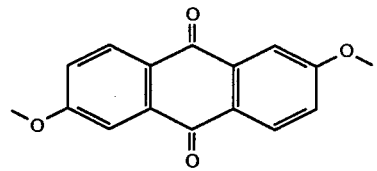 VII (h) 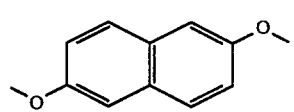 VIII 3. A wholly aromatic polyester as claimed in claim 1, which contains one or more units (V), (VI), (VII) and/or (VIII) in an amount of from 5 to 12 mol %.

4. A wholly aromatic polyester as claimed in claim 1, wherein the molar proportion of units of the formula I is from 15 to 25 mol %.

5. A wholly aromatic polyester as claimed in claim 1, wherein some of the units of the formula III are replaced by units of the formula IX (i) 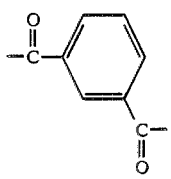

IX

6. A wholly aromatic polyester as claimed in claim 1, which has a glass transition temperature Tg of ≧160° C.

7. A fiber prepared from a wholly aromatic polyester as claimed in claim 1.

8. A film prepared from a wholly aromatic polyester as claimed in claim 1.

9. A molding prepared from a wholly aromatic polyester as claimed in claim 1.

10. A surface coating material prepared from a wholly aromatic polyester as claimed in claim 1.

* * * * *

UNITED STATES PATENT AND TRADEMARK OFFICE
CERTIFICATE OF CORRECTION

PATENT NO. : 4,778,927
DATED : Oct. 18, 1988
INVENTOR(S) : Kock

It is certified that error appears in the above-identified patent and that said Letters Patent is hereby corrected as shown below:

Col. 7, line 5: IX $\begin{matrix} "O" \\ \| \\ -C- \end{matrix}$ should be -- $\begin{matrix} O \\ \| \\ -O- \end{matrix}$ --

Signed and Sealed this

Seventh Day of March, 1989

Attest:

DONALD J. QUIGG

*Attesting Officer*     *Commissioner of Patents and Trademarks*